US009893956B2

(12) United States Patent
Cleary et al.

(10) Patent No.: US 9,893,956 B2
(45) Date of Patent: Feb. 13, 2018

(54) MANAGEMENT OF NETWORK CONFIGURATION IN TELECOMMUNICATIONS NETWORK

(75) Inventors: David Cleary, Athlone (IE); Epifanio Salamanca, Athlone (IE); Michael Cremin, Athlone (IE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 388 days.

(21) Appl. No.: 13/876,953

(22) PCT Filed: Sep. 29, 2010

(86) PCT No.: PCT/EP2010/064492
§ 371 (c)(1),
(2), (4) Date: Jul. 15, 2013

(87) PCT Pub. No.: WO2012/041374
PCT Pub. Date: Apr. 5, 2012

(65) Prior Publication Data
US 2013/0318224 A1    Nov. 28, 2013

(51) Int. Cl.
H04L 12/24     (2006.01)
H04L 29/06     (2006.01)
G06F 17/30     (2006.01)

(52) U.S. Cl.
CPC ............ H04L 41/50 (2013.01); H04L 41/024 (2013.01); H04L 41/08 (2013.01);
(Continued)

(58) Field of Classification Search
CPC .... G06Q 10/06; G06Q 30/0201; G06F 21/81; G06F 17/30575; H04L 63/1408; H04L 12/2606; H04L 43/00
See application file for complete search history.

(56) References Cited

U.S. PATENT DOCUMENTS 5,923,850 A     7/1999  Barroux
6,363,421 B2    3/2002  Barker et al.
(Continued)

FOREIGN PATENT DOCUMENTS

EP      1 955 479 B1     8/2008
WO      WO 03/045006     5/2003
WO      WO 2012/069077 A1  5/2012

OTHER PUBLICATIONS

International Search Report for PCT/EP2010/064492, dated Aug. 31, 2011.
(Continued)

Primary Examiner — Barbara B Anyan
(74) Attorney, Agent, or Firm — Baker Botts LLP

(57) ABSTRACT

A method for managing the configuration of a telecommunications network, the method comprises remotely creating a data file containing attributes of managed objects for one or more network elements of the network, uploading the data file to a management system of the network, inspecting the data file and identifying managed objects having attributes which have been created, varied or deleted, producing a database of the identified managed objects and the values thereof, and analysing the data in the database to manage the configuration of the telecommunications network accordingly. Also disclosed are an apparatus for performing the method, a management system incorporating the or apparatus and a telecommunications network incorporating the management system.

23 Claims, 2 Drawing Sheets

(52) U.S. Cl.
CPC ...... *H04L 41/0853* (2013.01); *H04L 41/0866* (2013.01); *G06F 17/30073* (2013.01); *H04L 29/06027* (2013.01)

(56) References Cited

U.S. PATENT DOCUMENTS

| | | | |
|---|---|---|---|
| 8,185,651 B2 | 5/2012 | Moran et al. | |
| 2002/0035625 A1 | 3/2002 | Tanaka | |
| 2003/0009401 A1* | 1/2003 | Ellis | 705/35 |
| 2005/0132074 A1* | 6/2005 | Jones | H04L 29/06027 709/229 |
| 2008/0172432 A1* | 7/2008 | Berkvens | G06F 17/30581 |
| 2008/0211670 A1* | 9/2008 | Gordon | 340/572.1 |
| 2009/0063393 A1* | 3/2009 | Saake | G06F 17/30073 |
| 2010/0229248 A1* | 9/2010 | Glave | 726/34 |

OTHER PUBLICATIONS

"3$^{rd}$ Generation Partnership Project; Technical Specification Group Services and System Aspects; Telecommunication Management; Configuration Management (CM); Bulk CM Integration Reference Point (IRP): Information Service (IS), Release 9", 3GPP TS 32.612, (Dec. 30, 2009), pp. 1-59.

Russian Office Action (English translation) for Application No. 2013119619/08 (029081), dated Jul. 23, 2015.

English Translation of Decision on Grant, A Patent for Invention, Federal Service on Intellectual Property (Rospatent), Russia, for Application No. 2013119619/08(029081) filed Sep. 29, 2010, (pdfs Part A and Part B), dated Dec. 21, 2015.

* cited by examiner

MANAGEMENT OF NETWORK CONFIGURATION IN TELECOMMUNICATIONS NETWORK

This application is the U.S. national phase of International Application No. PCT/EP2010/064492, filed 29 Sep. 2010, which designated the U.S., the entire contents of each of which is hereby incorporated herein by reference.

TECHNICAL FIELD

The invention relates to management of network configuration in telecommunications networks.

BACKGROUND

In the proprietary business support systems (BSS) and operation support systems (OSS) of a telecommunications network, many systems are needed to communicate together to successfully run and maintain a service provider network. Each such system needs to exchange information, which can be achieved by the engineering of a mediation node that extracts the information from the system's database or business logic.

Alternatively, a network element management system (EMS) may be provided in the network to expose network information to other systems via machine interfaces. A typical such EMS exposes network configuration information in document style via a bulk Configuration Management Integration Reference Point (CM IRP) or so-called north-bound interface of the EMS. This document may be in the Common Object Request Broker Architecture (CORBA) language or Extensible Markup Language (XML).

A typical deployment would see a remote third-party network planning application connect to the EMS via the north-bound interface thereof to download network configuration information in the above-mentioned document style. This information is then loaded into the business logic of the remote network planning application, whereupon some of the data can be changed and uploaded in the same document style back to the EMS, which then uploads the changed configuration information to network elements or nodes located within the network.

The information contained in the document exchanged through the north-bound interface comprises a sequence of connected data structures, which are referred to as Managed Objects (MO) in network management system (NMS) terminology. Each MO has a predefined set of attributes or parameters that can be set and can take the form of numerical or textual data types.

In summary, a third-party system (or it can be a third-party application running on the third-party system) will read network information in the form of MOs, apply some algorithms to the information and upload the changes to the MO attributes via the north-bound interface. The EMS of the network will then process the network changes and reconfigure the network elements that are affected by the MO changes.

The above-mentioned procedure for a typical EMS of a telecommunications network will now be described with reference to FIG. 1 of the accompanying drawings. A third-party application 10 retrieves network information as an XML document 12 via the north-bound interface 13 of the EMS 11 of the telecommunications network. The third-party application 10 then applies some business logic to this information, such as to read, write, delete or add MOs. The amended document 12 is then uploaded via the north-bound interface 13 to the EMS 11. The EMS 11 then communicates with appropriate network elements 14 of the telecommunications network to implement the changes in the network.

In some types of EMS 11, the MO information is also cached in a cache store 15 provided within the EMS 11. This cached information is configured as either ACTIVE (what is actual in the network elements 14) or PLANNED (what the configuration will be after the changes are implemented). The information within the cache store 15 is then synchronised on a regular basis with appropriate network elements 14 of the telecommunications network. This synchronisation is facilitated by the logic stored at a network element adaptor (NEAD) 16 contained within the EMS 11. It should be noted that the cache is created and maintained using different replication strategies: this allows for different level synchronisation intervals of the MOs, since some MOs change a lot some are fairly static.

The key assumption is that network changes are exchanged through the EMS 11 via the north-bound interface 13. The bulk style of the interface 13 takes a snap shot of the network to be exported to the third party application 10. In this environment, it is important that the EMS 11 is able to quickly service requests from the third party application 10 and therefore it is important that the some information is cached to support the bulk interface style.

The problems with known arrangements can be summarised into three key areas. Firstly, an inherent problem with any cache system is to decide what should be cached and to decide upon how often the information kept in the cache 15 should be synchronised. The current approach is to setup the caching policies based on expected usage, this being based on how the network application makes use of it. However, since third-party applications also make use of the information, a policy based on network application usage does not present a true picture of how and when the information is updated. As such, the actual usage might differ and the caching policies would have to reflect this.

Secondly, north-bound or other bulk style interfaces 13 to the EMS 11 are not cognisant of the data in their payload. As a result no optimisation is used on information being received or sent from EMS 11.

Thirdly, the final and most important problem is in relation to the verification of the configuration information being sent to the EMS 11 from the third-party application 10. The graphical user interface (GUI) 17 of the EMS 11 application encodes business logic, which controls the options available to third-party application network engineers. The north-bound or other bulk style interfaces 13 by their nature push this responsibility to the third-party application 10 that creates the bulk imports. Although a business logic element 18 of the EMS 11 checks for some syntax related information on information that is uploaded on the bulk import, the information is not verified. Hence, there is a risk that the uploaded information may contain errors or omissions, which may adversely affect the operation of the network elements 14.

We have now devised an improved method and apparatus for the management of network configuration in telecommunications networks.

SUMMARY

In accordance with the present invention, as seen from a first aspect, there is provided a method of managing configuration of a telecommunications network, the method comprising:

a) receiving, in a management system of the network, a remotely created data file containing attributes of managed objects for one or more network elements of the network;
b) inspecting the data file and identifying managed objects having attributes which have been created, varied or deleted;
c) producing a database of the identified managed objects and the values thereof; and
d) analysing the data in the database to manage the configuration of the telecommunications network accordingly.

The present invention thus intercepts uploads to the management system (EMS) e.g. via the north-bound interface and analyses the information stored in the request such that the management of the network can be facilitated.

In one embodiment the inspecting step comprises inspecting the data file for commands contained therein which create, vary or delete managed objects.

In another embodiment, the inspecting step comprises comparing the data file with a data file containing existing attributes of managed objects of network elements of the network and identifying managed objects having attributes which have been created, varied or deleted.

The data file can be created by examining a data file downloaded from the management system, the downloaded file containing existing attributes of managed objects of network elements of the network.

The time and/or date when the respective identified managed objects are created, varied or deleted can also be stored in the database.

The analysing step may comprise analysing any frequency of creation, variation or deletion of each managed object and producing a policy for the synchronization of a managed object cache within said management system with the managed objects of network elements of the network. This allows information to be gathered to optimise the EMS caching mechanism.

The managed object cache may be synchronised with the managed objects of network elements of the network in dependence of the frequency of creation, variation or deletion of each managed object.

The analysing step may comprise identifying repeating patterns in the creation, variation or deletion of managed objects, and using the analysis to suggest future workflows in the creation, variation or deletion of managed objects. In this way a workflow can be extracted from bulk operations to allow SOA (service oriented architecture) style interfaces to be created.

The analysing step may also comprise identifying a pattern in the creation, variation or deletion of managed objects which causes an error in the network, and using the analysis to provide a warning if the pattern is detected on a subsequent inspecting step. In this way, errors in bulk requests can be caught.

Also in accordance with the present invention, there is provided an apparatus for managing the configuration of a telecommunications network, the apparatus comprising:
a) a monitor for monitoring data files received by a management system of the network, the data files containing attributes of managed objects for one or more network elements of the network, the monitor being arranged to inspect the data file and to identify managed objects having attributes which have been created, varied or deleted;
b) a database for storing the identified managed objects and the values thereof; and
c) a processor for analysing the data in the database and to manage the configuration of the telecommunications network accordingly.

The apparatus may be a stand-alone unit or card arranged for connecting to a remote management system. Alternatively, the apparatus may be provided within the management system.

The monitor may be arranged to inspect the data file for commands contained therein which create, vary or delete managed objects.

The monitor may be arranged to compare the data file with a data file containing existing attributes of managed objects of network elements of the network and to identify managed objects having attributes which have been created, varied or deleted.

The apparatus may be arranged to store in the database the time and/or date when the identified managed objects are created, varied or deleted together with the respective identified managed objects and the values thereof.

The apparatus may be arranged to analyse the frequency of creation, variation or deletion of each managed object and to produce a policy for the synchronization of a managed object cache within said management system with the managed objects of network elements of the network.

The apparatus may be arranged to identify repeating patterns in the creation, variation or deletion of managed objects, and to suggest future workflows in the creation, variation or deletion of managed objects.

The apparatus may be arranged to identify a pattern in the creation, variation or deletion of managed objects which causes an error in the network, and to use said analysis to provide a warning if the pattern is subsequently identified by said monitor.

Also in accordance with the present invention, there is provided a management system for a telecommunications network, the system comprising an apparatus as hereinbefore defined.

The management system may be arranged to synchronise said managed object cache with the managed objects of network elements of the network in dependence of the frequency.

Also in accordance with the present invention, there is provided a telecommunications network comprising a management system as hereinbefore defined.

The present invention thus provides a mechanism for monitoring the information exchanged through a bulk or so-called north-bound interface of a management system/EMS and creates a catalogue of the information gathered. The information is then analysed to look for recurrent patterns of variations in the information. The analysed information can be used for providing reports, to change the caching policy used by the management system, to identify potential workflow process and to detect errors or omissions, which may adversely affect the operation of the network.

Conceptually the invention in its embodiments can be thought of in three parts. Firstly, the inspection of MO information being received by the EMS (or in other words uploaded by third parties to the EMS): this is achieved by monitoring the bulk or north-bound interface either by introducing a new monitoring feature on the management system/EMS or by adding a device that intercepts the information.

Secondly, the information obtained from the read, write, delete or add MOs requests submitted by the third or external party or can be stored in a database based on the type of MO.

Finally, the stored information can be analysed to report or implement changes in caching policies, to report likely workflow process and to report misconfigurations.

BRIEF DESCRIPTION OF THE DRAWINGS

An embodiment of the present invention will now be described by way of example only and with reference to the accompanying drawings, in which.

DETAILED DESCRIPTION

Figure 1:
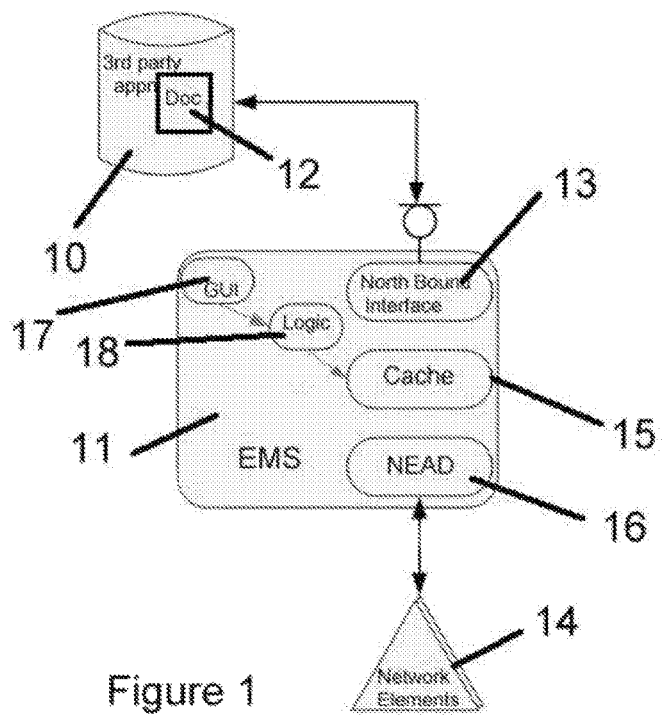
FIG. 1 is a block diagram of a portion of known telecommunications network incorporating a network element management system.
Figure 2:
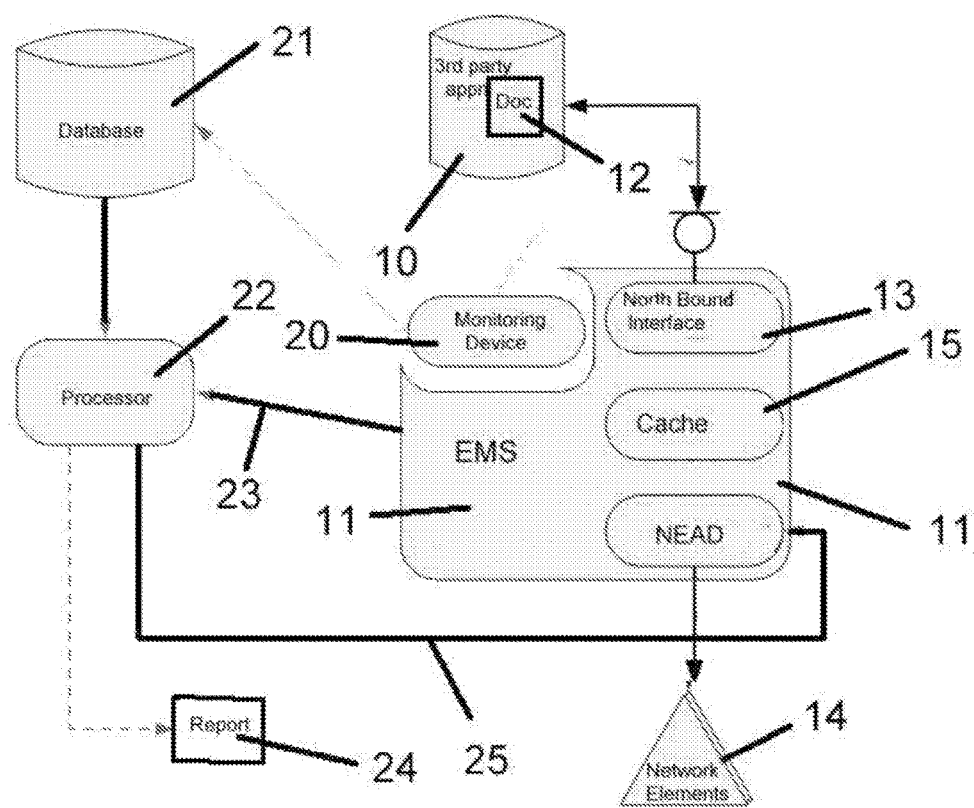
FIG. 2 is a block diagram of a portion of a telecommunications network incorporating a network element management system in accordance with an embodiment of the present invention.
Figure 3:
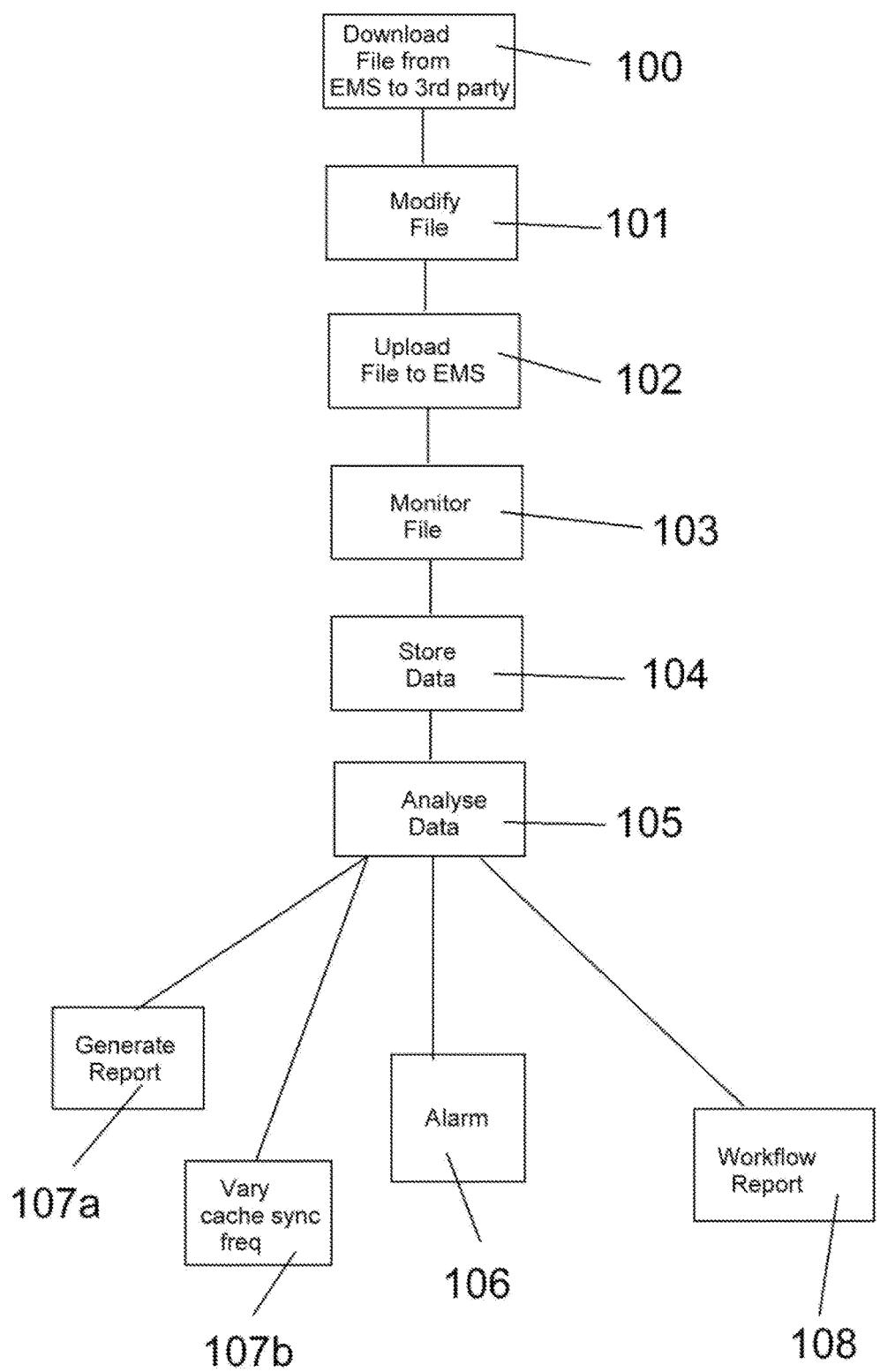
FIG. 3 is a flow diagram illustrating one embodiment of the method of the present invention.

Referring to FIGS. 2 and 3 of the drawings, there is shown in FIG. 2 a portion of telecommunications network which is similar to the known network of FIG. 1 and like parts are given like reference numerals.

Initially an XML file 12 containing details of the existing MOs on the network is downloaded from the EMS 11 to a remote third-party system 10 (or a third-party application running at the third party system) at step 100.

In an alternative embodiment the document 12 can be created in a language different than XML.

In accordance with an embodiment of the present invention, a device 20 is provided for monitoring at step 103 the XML information about the MOs that are contained in the file 12 exchanged between the EMS 11 and the remote third-party system 10 via the north-bound interface 13 of the EMS 11.

As hereinbefore mentioned, the remote third-party system 10 can create, modify or delete information about one or more MOs encoded in the XML document (or XML file) 12 at step 101. By modifying the downloaded XML file a new XML file (or XML document) is created. The document 12 is then received by the EMS 11 (uploaded to the EMS 11) at step 102.

The monitoring device 20 of the present invention intercepts the uploaded document 12 before it is processed by the EMS 11. The monitoring device 20 can reside within the EMS 11 or it can be hosted in an external device that is on the same sub network as the north-bound interface 13 resides. The monitoring device 20 extracts all of the remote procedure call information as well as the management protocol information. The remaining information (i.e. a set of MOs and operations to be carried out on them) is stored at step 104 in a database 21 together with a time date stamp and session information from file 12 uploaded by the third-party system 10.

The database 21 can reside on the EMS 11 or remotely. The database stores and catalogues all the external MO operations in a structural manner according to the type of MO. This database is may be arranged to store information received from a plurality of monitoring devices 20 provided in respective EMS instances.

At step 105, a processing device 22 constantly retrieves information from the MO database 21 as well as data network faults received from the EMS via input 23. The processing device 22 runs set of rules that correlate requests uploaded via the north-bound interface 13 and events received via the input 23 and historical information stored in the database 21. On completion of the analysis, if an error is detected a report 24 or an alarm is generated at step 106.

Also at step 105, the processing device 22 mines the information stored in the database 21 for reoccurring operations on sets of MOs. Depending on its configuration the processing device 22 either generates a report at step 107a that specifies the MOs that need more regular caching. Alternatively, the processing device 22 can invoke a request at step 107b via link to 25 to change the frequency that the affected MOs are refreshed in the cache 15. In either way, the EMS 11 can thus be configured to contain a more up-to-date record of the network configuration in the cache 15 without having to regularly synchronise with every network element 14 to determine the names and attributes of the MOs therein. In this manner, the number of synchronisation requests is reduced and unnecessary south-bound network traffic between the EMS 11 and the network elements 14 is avoided.

The processing device 22 also monitors at step 108 the database 21 for workflow patterns of MO variations that are linked together. For example, it often follows that the attributes of one MO must be varied following the variation of another, otherwise a network error will be created. The processing device 22 thus learns the actions of third party engineers by recognising repeating patterns of MO variation. This information can then be tabulated into the report 24 and fed back for use by other engineers so that they know what MOs need to be varied following the variation of others. The information can also be used to provide the EMS 11 with an automated service oriented architecture (SOA). At the same time as generating the tabulated report 24 about the MO pattern variations, the processing device 22 is able to provide a service that just exposes the MOs identified on the report, for example when introducing a new network element, and builds a routine which can be implemented in the future when adding the same network element. In this manner, engineers do not have to remember what MOs have to be set when introducing or updating a network element.

One way of producing a reliable caching policy is by using the processor 22 to monitor for regular variation of certain MO's, for example by identifying any updating (attributes changed), deleting or creation (new instances created) of MOs. For each operation different caching policies are applicable. However a key aspect is the time series information and historical information stored in the database 21. In the following example taken from a live network, each time an exchange of information occurs between the EMS 11 and the remote third-party system 13 via the north-bound interface 13, a record is created in the database 21 containing the time, the name of the MOs and whether the MO is created, deleted or updated.

| Time: | 11:30 | | | |
|---|---|---|---|---|
| | MO | Created | Deleted | Updated |
| Name of MO: | GsmRelation | 3 | 0 | 0 |
| | 13:25 | | | |
| | MO | Created | Deleted | Updated |
| | GsmRelation | 29 | 0 | 0 |
| | 13:30 | | | |
| | MO | Created | Deleted | Updated |
| | UtranRelation | 86 | 0 | 0 |
| | 13:35 | | | |
| | MO | Created | Deleted | Updated |
| | UtranRelation | 86 | 0 | 0 |
| | 13:57 | | | |
| | MO | Created | Deleted | Updated |
| | Carrier | 0 | 0 | 3 |

| | | | |
|---|---|---|---|
| IubDataStreams | 0 | 0 | 1 |
| NodeBFunction | 0 | 0 | 1 |
| RbsLocalCell | 0 | 0 | 3 |
| TxDeviceGroup | 0 | 0 | 1 |
| 16:55 | | | |
| MO | Created | Deleted | Updated |
| Eul | 3 | 0 | 0 |
| Hsdsch | 0 | 0 | 3 |
| IubEdch | 1 | 0 | 0 |
| UtranCell | 0 | 0 | 3 |
| 18:13 | | | |
| MO | Created | Deleted | Updated |
| GsmRelation | 24 | 0 | 0 |
| 18:26 | | | |
| MO | Created | Deleted | Updated |
| UtranRelation | 42 | 0 | 0 |

In the above example of sequential records from the database 21, it can be seen that 3 instances of an MO called GsmRelation were created at 11:30. It can also be seen that MOs called UtranRelations are created regularly and that MOs called carrier and RbsLocalCell are updated regularly. Thus by analysing the sequence over a longer period of time, an accurate caching policy can be devised by the processor 22.

As hereinbefore mentioned, the identification of potential SOA interfaces can be suggested by correlating any clustering of MO types over time.

| | | | |
|---|---|---|---|
| March 19 at 02:09 | | | |
| MO | Created | Deleted | Updated |
| Aal2PathVccTp | 0 | 0 | 60 |
| IubLink | 0 | 0 | 30 |
| NbapCommon | 0 | 0 | 30 |
| NbapDedicated | 0 | 0 | 30 |
| UtranCell | 0 | 0 | 90 |
| Feb 5 at 02:20 | | | |
| MO | Created | Deleted | Updated |
| Aal2PathVccTp | 0 | 0 | 12 |
| IubLink | 0 | 0 | 6 |
| NbapCommon | 0 | 0 | 6 |
| NbapDedicated | 0 | 0 | 6 |
| UtranCell | 0 | 0 | 18 |

In the above example of two non-sequential records from the database 21, it can be seen that a recurring workflow pattern can be identified in the types of MO that are varied at different times in the same manner. This workflow pattern is then reported in step 108. Accordingly, the processor 22 is able to identify that the MOs Aal2 PathVccTp, IubLink, NbapCommon, NbapDedicated, UtranCell are always updated in that order and hence the workflow data can be used to provide an SOA routine which automatically suggests to third-third party engineers that e.g. the MOs IubLink, NbapCommon, NbapDedicated, UtranCell need to be updated if Aal2 PathVccTp is updated. In practice, more than two sequential or non-sequential identical workflows would need to occur before a pattern could be established. The processor 22 would thus have time recording and frequency of occurrence within that period as parameters.

In a similar manner, the processor 22 can monitor for fault alarms via link 33 and can determine the MO variation(s) that caused the alarm. Hence a third party can be alerted that an error may be caused by the proposed recognised variation.

This present invention provides thus a means to reassure a telecoms service provider of the integrity of the network independent of external third-party systems. This present invention secondly provides a mechanism for gathering statistics on both real-time and historical information on the usage of EMS management systems: this can be used in a managed service environment to optimise multi EMS configuration. This present invention thirdly provides a mechanism for tracking sets of MOs, which correspond to real network operation. As the number of network elements increase, this present invention fourthly provides a mechanism in the EMS for optimising MO cache synchronisms, based on the actual frequency that the respective MOs are being varied.

The invention claimed is:

1. A method of managing configuration of a telecommunications network, the method comprising:
performing, by at least one computing device, a synchronization of a plurality of managed objects within a managed object cache of a management system with a plurality of associated managed objects of network elements of the telecommunications network, the synchronization performed periodically according to a frequency associated with a caching policy;
receiving, by the at least one computer processing device of the management system of the network, a remotely created data file containing attributes of the managed objects for one or more network elements of the network;
inspecting, by the at least one computer processing device, the data file and identifying managed objects having a plurality of attributes and a plurality of operations associated with the managed objects;
extracting, by the at least one computer processing device, the plurality of attributes and the plurality of operations associated with the managed objects;
producing, by the at least one computer processing device, a database of the plurality of attributes and the plurality of operations associated with the managed objects; and
analyzing, by the at least one computer processing device, the plurality of attributes and the plurality of operations in the database to identify at least one reoccurring operation on a set of affected managed objects within the plurality of objects; and
based on the identified at least one reoccurring operation on the set of affected managed objects, changing, by the at least one computer processing device, the frequency of the synchronization of the set of affected managed objects within the managed object cache of the management system with the associated managed objects of the network elements of the network to optimize the caching policy based on actual usage of affected managed objects rather than expected usage of managed objects, the frequency of the synchronization of the affected objects changed without changing the frequency of the synchronization of the plurality of managed objects other than the set of affected managed objects associated with the identified at least one reoccurring operation.

2. A method as claimed in claim 1, in which said inspecting step comprises inspecting the data file for commands contained therein which create, vary or delete managed objects.

3. A method as claimed in claim 1, in which said inspecting step comprises comparing the data file with a data file containing existing attributes of managed objects of network elements of the network and identifying managed objects having attributes which have been created, varied or deleted.

4. A method as claimed in claim 1, in which said data file is created by examining a data file downloaded from said management system, said downloaded file containing existing attributes of managed objects of network elements of the network.

5. A method as claimed in claim 1, comprising storing in said database the time and/or date when the respective identified managed objects are created, varied or deleted.

6. A method as claimed in claim 5, in which said analyzing step comprises analyzing any frequency in the creation, variation or deletion of each affected managed object.

7. A method as claimed in claim 6, comprising synchronizing said managed object cache with the affected managed objects of network elements of the network in dependence of the frequency.

8. A method as claimed in claim 1, in which said analyzing step comprises identifying repeating patterns in the creation, variation or deletion of affected managed objects, and using said analysis to suggest future workflows in the creation, variation or deletion of affected managed objects.

9. A method as claimed in claim 1, in which said analyzing step comprises identifying a pattern in the creation, variation or deletion of affected managed objects which causes an error in the network, and using said analysis to provide a warning if the pattern is detected on a subsequent inspecting step.

10. An apparatus for managing configuration of a telecommunications network, the apparatus comprising:
a monitor device operable to:
monitor data files received by a management system of the telecommunications network, the data files containing attributes of a plurality of managed objects for one or more network elements of the telecommunications network;
inspect the data file and identify the managed objects having a plurality of attributes and a plurality of operations associated with the managed objects; and
extract the plurality of attributes and the plurality of operations associated with the managed objects;
a database for storing, in a managed object cache, the plurality of attributes and the plurality of operations extracted by the monitor device; and
a processor operable to:
periodically perform a synchronization of the plurality of managed objects in the managed object cache with a plurality of associated managed objects of the network elements of the telecommunications network, the synchronization performed according to a frequency associated with a caching policy;
analyze the plurality of attributes and the plurality of operations in the database to identify at least one reoccurring operation on a set of affected managed objects within the plurality of objects; and
based on the identified at least one reoccurring operation on the set of affected managed objects, change the frequency of the synchronization of the set of affected managed objects within the managed object cache of the management system with the associated managed objects of the network elements of the network to optimize the caching policy based on actual usage of affected managed objects rather than expected usage of managed objects, the frequency of the synchronization of the affected objects being changed without changing the frequency of the synchronization of the plurality of managed objects other than the set of affected managed objects associated with the identified at least one reoccurring operation.

11. An apparatus as claimed in claim 10, arranged for connecting to a remote said management system.

12. An apparatus as claimed in claim 10, arranged within said management system.

13. An apparatus as claimed in claim 10, in which said monitor is arranged to inspect the data file for commands contained therein which create, vary or delete managed objects.

14. An apparatus as claimed in claim 10, in which said monitor is arranged to compare the data file with a data file containing existing attributes of managed objects of network elements of the network and to identify managed objects having attributes which have been created, varied or deleted.

15. An apparatus as claimed in claim 10, arranged to store in the database the time and/or date when the identified managed objects are created, varied or deleted together with the respective identified managed objects and the values thereof.

16. An apparatus as claimed in claim 15, arranged to analyze the frequency of creation, variation or deletion of each affected managed object and to produce a synchronization interval for the periodic synchronization of the managed object cache of the management system with the managed objects of network elements of the network.

17. An apparatus as claimed in claim 10, arranged to identify repeating patterns in the creation, variation or deletion of the affected managed objects, and to suggest future workflows in the creation, variation or deletion of the affected managed objects.

18. An apparatus as claimed in claim 10, arranged to identify a pattern in the creation, variation or deletion of the affected managed objects which causes an error in the network, and to use said analysis to provide a warning if the pattern is subsequently identified by said monitor.

19. A management system for a telecommunications network, the system comprising an apparatus for managing configuration of a telecommunications network, the apparatus comprising:
a monitor device operable to:
monitor data files received by a management system of the network, the data files containing attributes of a plurality of managed objects for one or more network elements of the network;
inspect the data file and identify the managed objects having a plurality of attributes and a plurality of operations associated with the managed objects; and
extract the plurality of attributes and the plurality of operations associated with the managed objects;
a database for storing, in a managed object cache, the plurality of attributes and the plurality of operations extracted by the monitor device; and
a processor operable to:
perform, a synchronization of the plurality of managed objects within the managed object cache of the management system with a plurality of associated managed objects of the network elements of the telecommunication network, the synchronization performed periodically according to a frequency associated with a caching policy;
analyze the plurality of attributes and the plurality of operations in the database to identify at least one reoccurring operation on a set of affected managed objects within the plurality of objects; and
based on the identified at least one reoccurring operation on the set of affected managed objects, change the frequency of the synchronization of the set of affected managed objects within the managed object cache of the management system with the managed objects of network elements of the network to optimize the caching policy based on actual usage of affected managed objects rather than an expected usage of managed objects without changing the frequency of the synchronization of the plurality of managed objects other than the set of the affected managed objects associated with the identified at least one reoccurring operation.

20. A management system as claimed in claim 19, wherein the apparatus comprises the apparatus arranged for connecting to a remote said management system.

21. A management system as claimed in claim 19, arranged to synchronizing said managed object cache with the managed objects of network elements of the network in dependence of the frequency.

22. A telecommunications network comprising a management system, the system comprising an apparatus for managing configuration of the telecommunications network, the apparatus comprising:
   a monitor device operable to:
      monitor data files received by a management system of the network, the data files containing attributes of a plurality of managed objects for one or more network elements of the network;
      inspect the data file and identify the managed objects having a plurality of attributes and a plurality of operations associated with the managed objects; and
      extract the plurality of attributes and the plurality of operations associated with the managed objects;
   a database for storing, in a managed object cache, the plurality of attributes and the plurality of operations extracted by the monitor device; and
   a processor operable to:
      perform, a synchronization of the plurality of managed objects within the managed object cache of the management system with plurality of associated managed objects of the network elements of the telecommunication network, the synchronization performed periodically according to a frequency associated with a caching policy;
      analyze the plurality of attributes and the plurality of operations in the database to identify at least one reoccurring operation on a set of affected managed objects within the plurality of objects; and
      based on the identified at least one reoccurring operation on the set of affected managed objects, change the frequency of the synchronization of the set of affected managed objects within a managed object cache of the management system with the managed objects of network elements of the network to optimize the caching policy based on actual usage of affected managed objects rather than expected usage of managed objects, the frequency of the synchronization of the affected objects changed without changing the frequency of the synchronization of the plurality of managed objects other than the set of affected managed objects associated with the identified at least one reoccurring operation.

23. A telecommunications network as claimed in claim 22, wherein the management system comprises the management system arranged for connecting to a remote said management system.

* * * * *